(12) United States Patent
Skorucak

(10) Patent No.: US 7,055,664 B2
(45) Date of Patent: Jun. 6, 2006

(54) DOG CLUTCH DEVICE

(75) Inventor: Bela Skorucak, Cormeilles en Parisis (FR)

(73) Assignee: Thales, Neuilly sur Seine (FR)

( * ) Notice: Subject to any disclaimer, the term of this patent is extended or adjusted under 35 U.S.C. 154(b) by 84 days.

(21) Appl. No.: 10/494,863

(22) PCT Filed: Dec. 13, 2002

(86) PCT No.: PCT/FR02/04348

§ 371 (c)(1),
(2), (4) Date: May 7, 2004

(87) PCT Pub. No.: WO03/054404

PCT Pub. Date: Jul. 3, 2003

(65) Prior Publication Data

US 2004/0262112 A1 Dec. 30, 2004

(30) Foreign Application Priority Data

Dec. 14, 2001 (FR) .................................. 01 16161

(51) Int. Cl.
*F16D 11/04* (2006.01)
*F16D 49/04* (2006.01)
(52) U.S. Cl. .................. 192/17 C; 192/17 D; 192/101; 192/102; 464/31
(58) Field of Classification Search .............. 192/69.2, 192/102, 17 C, 17 D
See application file for complete search history.

(56) References Cited

U.S. PATENT DOCUMENTS

| 2,307,531 | A |   | 1/1943 | Morton |
| 2,509,813 | A |   | 5/1950 | Dineen |
| 3,001,620 | A | * | 9/1961 | Olchawa et al. ............... 192/24 |
| 3,889,789 | A | * | 6/1975 | Boehringer ............... 192/82 T |
| 4,086,991 | A | * | 5/1978 | Swadley ................... 192/82 T |
| 4,269,294 | A |   | 5/1981 | Kelbel |
| 4,271,947 | A | * | 6/1981 | Gaeckle .................... 192/82 T |
| 4,934,977 | A | * | 6/1990 | Falconer et al. .............. 464/31 |
| 5,103,949 | A | * | 4/1992 | Vanderzyden et al. ........ 192/24 |

FOREIGN PATENT DOCUMENTS

GB  2 307 531 A  *  5/1997

* cited by examiner

*Primary Examiner*—Rodney H. Bonck
(74) *Attorney, Agent, or Firm*—Lowe Hauptman & Berner, LLP

(57) ABSTRACT

A device is disclosed for coupling two shafts for rotating in the prolongation of one another with respect to a casing. A dog clutch ensures that the two shafts are coupled. The device comprises a clutch release uncouple the dog clutch. The clutch release comprises a screw secured to one of the shafts, a nut secured to a flywheel and cooperating with the screw. The screw and nut have an axis coinciding substantially with the axis of rotation of the shafts, and a brake for braking the rotation of the flywheel with respect to the casing, and, in the clutch engagement position, the braking of the flywheel slackens the nut of the screw and drives one of the shafts in translational motion along said axis, so as to uncouple the dog clutch. The structure of the clutch release makes it possible to uncouple the shafts when these are in rotation.

16 Claims, 3 Drawing Sheets

DOG CLUTCH DEVICE

BACKGROUND OF THE INVENTION

The invention relates to a device for coupling two shafts which are intended for rotating in the prolongation of one another. A dog clutch ensures that the two shafts are coupled. A dog clutch generally comprises teeth or claws belong to each of the two shafts. When the teeth (or claws) cooperate with one another, two shafts are coupled. A dog-clutch coupling device likewise comprises means for separating the teeth of each shaft in order to uncouple them. These means will be called clutch release means in the rest of the description.

Known clutch release means necessitate the stopping of the rotation of the two shafts and a high external force making it possible to separate the teeth. To be precise, the teeth are generally kept in contact by means of a spring, and it is therefore necessary to overcome the force of this spring in order to release the clutch.

SUMMARY OF THE INVENTION

The object of the invention is to mitigate these difficulties by proposing a dog-clutch coupling device, in which the clutch release means can uncouple the shafts even when these are in rotation. Allowing rotational uncoupling makes it possible to use the clutch release means as a safety member. They make it possible to uncouple quickly, without waiting for the rotation to stop.

For this purpose, the subject of the invention is a device for coupling two shafts which are intended for rotating with respect to a casing, in the prolongation of one another substantially about an axis, the device comprising a dog clutch making it possible for one of the shafts to drive the other and clutch release means making it possible to uncouple the dog clutch, characterized in that the clutch release means comprise a screw secured to one of the shafts, a nut secured to a flywheel and cooperating with the screw, the screw and the nut having an axis coinciding substantially with the axis of rotation of the shafts, and a brake for braking the rotation of the flywheel with respect to the casing, and in that, in the clutch engagement position, the braking of the flywheel slackens the nut of the screw and drives one of the shafts in translational motion along said axis, so as to uncouple the dog clutch.

The invention makes it possible, furthermore, to reduce considerably the force necessary for clutch release. By virtue of the invention, the force necessary for separating the teeth of the dog clutch is no longer supplied by means external to the device, but by the device itself and, more specifically, by the rotational energy of the shafts.

The invention also makes it possible to reduce considerably the mass of the clutch release means and to increase their compactness.

BRIEF DESCRIPTION OF THE INVENTION

The invention will be understood more clearly and other advantages will become apparent from a reading of the detailed description of an embodiment of the invention given by way of example, the description being illustrated by the accompanying drawing in which.

To simplify the rest of the description, the same elements will bear the same references in the various figures.

DETAILED DESCRIPTION OF THE PREFERED EMBODIMENT

Figure 1:
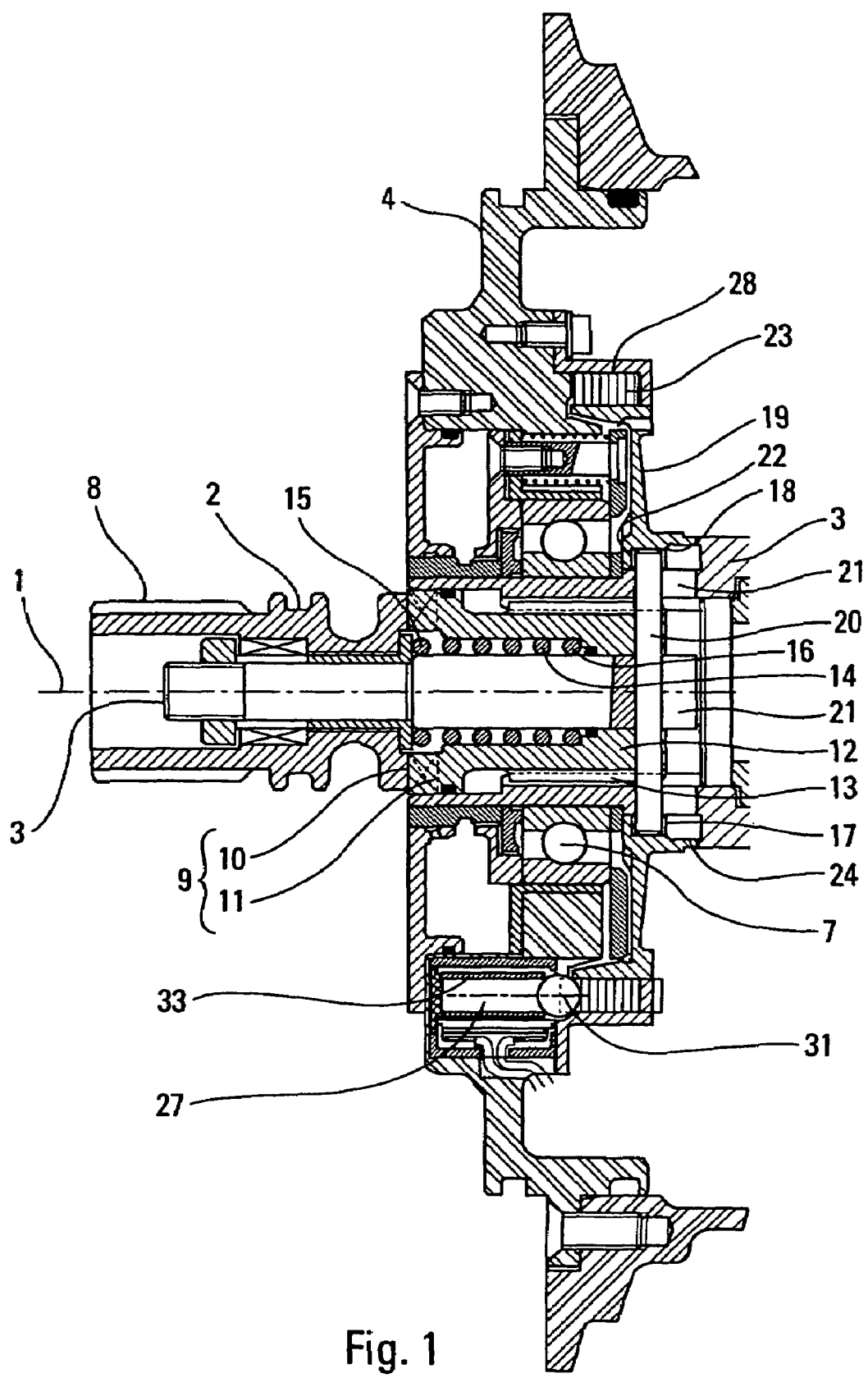
FIG. 1 illustrates a coupling device in the clutch engagement position.

FIG. 1 illustrates a coupling device in section along a plane comprising an axis 1, about which two shafts 2 and 3 can rotate with respect to a casing 4. The shaft 3 is, for example, that of the rotor of an electric motor. A rotary bearing comprising, for example, a rolling bearing 7 allows the shaft 3 to rotate with respect to the casing 4, rotation taking place about the axis 1. The shaft 2 makes it possible, for example, to couple the electric motor to a relay box (not illustrated) by means of splines 8.

A dog clutch 9 makes it possible to couple and uncouple the shafts 2 and 3. According to the example illustrated, the dog clutch 9 comprises a first series of teeth 10 secured to the shaft 2 and a second series of teeth 11 secured to one end 12 of the shaft 3. The end 12 is movable in translational motion along the axis 1 with respect to the shaft 3. A rotational connection of the end 12 along the axis 1 with respect to the shaft 3 is ensured by means of splines 13. The teeth 10 and the teeth 11 cooperate with one another so as to ensure that the shaft 2 is driven by the shaft 3 when the coupling device is in the clutch engagement position. It goes without saying that the invention is not limited to the drive of the shaft 2 and the shaft 3. The reverse is likewise possible, for example if the electric motor is used in the mode for the generation of electrical current.

A helical spring 14 tends to keep the teeth 10 and 11 separated. The spring 14 bears at its first end 15 on the shaft 2 and its second end 16 on the end 12. When the teeth 11 and 12 are in contact, the coupling device is in the clutch engagement position and the spring 14 is compressed.

Clutch release means make it possible to uncouple the dog clutch 9. More specifically, these means make it possible to separate the teeth 10 from the teeth 11 in order to obtain a clutch release position of the coupling device.

Figure 2:
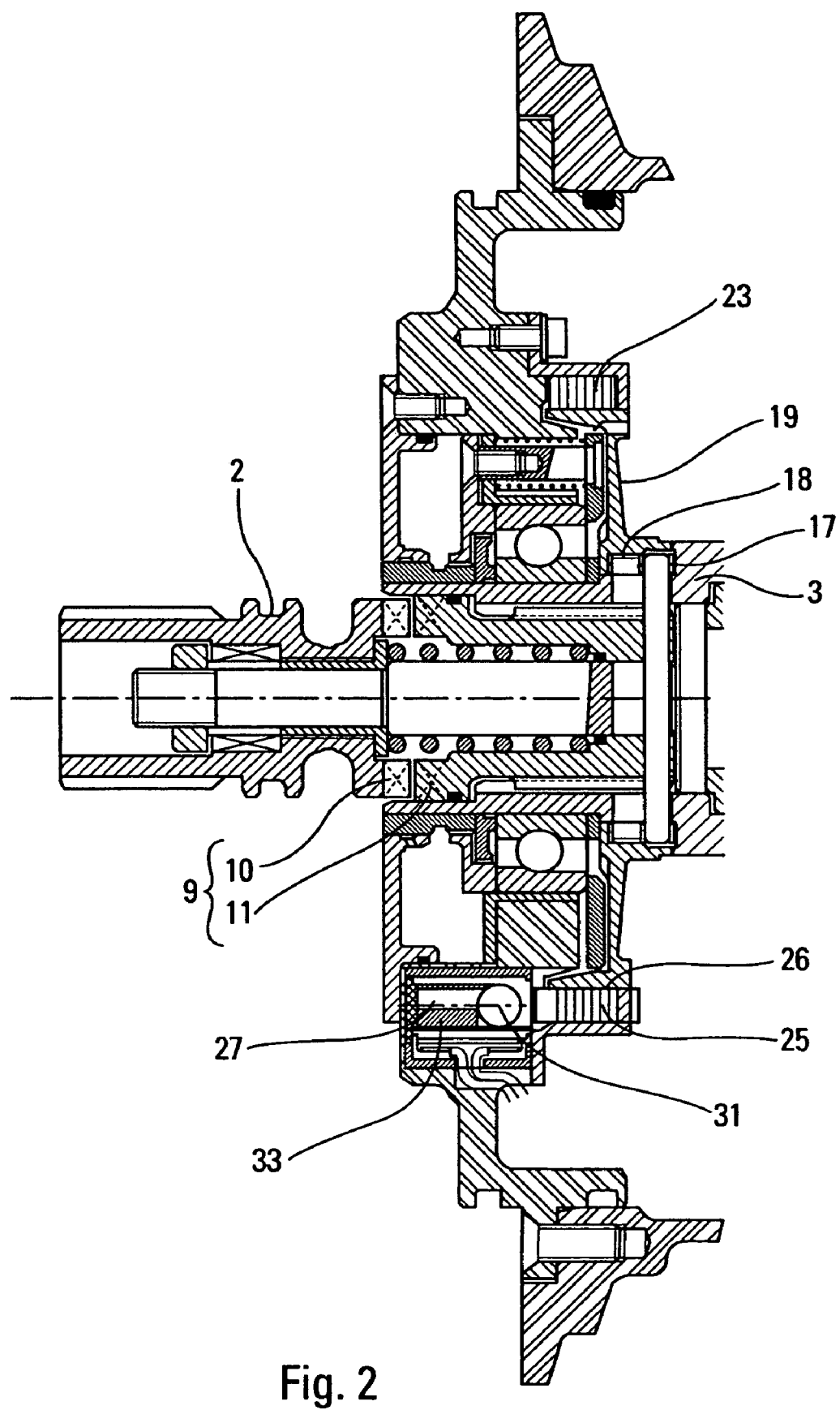
FIG. 2 illustrates the coupling device in the clutch release position.

The clutch release position will be described later with the aid of FIG. 2. In order to separate the teeth 10 from the teeth 11, the clutch release means relax the spring 14 by executing a translational motion of the end 12 with respect to the shaft 3.

According to the invention, the clutch release means comprise a screw 17 secured to the shaft 3 and a nut 18 secured to a flywheel 19. The screw 17 and the nut 18 cooperate with one another and their axis coincides substantially with the axis 1. More specifically, the screw 17 is secured to the end 12 of the shaft 3. The screw 17 is held together with the end 12, for example, by means of a pin 20. Moreover, the pin 20 passes through an oblong hole 21 formed in the shaft 3, in order to allow the translational motion of the end 12 with respect to the shaft 3.

In the clutch engagement position, the nut 18 is clamped on the screw 17. The flywheel 19 comprises a stop 22 on which the screw 17 bears. This bearing contact ensures that the nut 18 is clamped on the screw 17. In the clutch engagement position, the flywheel 19 has the same movement, a rotational movement with respect to the casing 4, as the shaft 3 and its end 12.

The clutch release means comprise, furthermore, a brake 23 for braking the rotation of the flywheel 19 with respect to the casing 4. In the clutch engagement position, the brake 23 is not active, and the flywheel 19 rotates freely with respect"

to the casing 4 about the axis 1. When the dog clutch 9 is to be released, that is to say the teeth 10 and 11 are to be separated, so that the teeth 10 no longer drive the teeth 11, or vice versa, the brake 23 is actuated until the nut 18 of the screw 17 is slackened. The flywheel 19 possesses only one degree of rotational freedom about the axis 1 with respect to the casing 4. Consequently, the slackening of the nut 18 with respect to the screw 17 allows the translational motion of the end 12 with respect to the shaft 3 along the axis 1 and therefore the separation of the teeth 10 and 11.

Advantageously, the device, when in the clutch release position, comprises means for allowing the screw 17 to rotate independently of the nut 18. These means for allowing the rotation of the screw 17 comprise a groove 24 belonging to the flywheel 19, within which groove 24 the screw 17 can rotate freely, independently of the nut 18. The means for allowing the rotation of the screw 17 comprise, furthermore, an elastic element which, in the clutch release position, ensures that the screw 17 is held within the groove 24.

More specifically, the groove 24 is formed in the flywheel 19. The groove 24 is internal and cylindrical with the axis 1. Its diameter is greater than the nominal diameter of the thread of the screw 17. The groove 24 can contain the screw 17 after the complete slackening of the nut 18. When the screw 17 is located within the groove 24, the clutch release is effective and the translational movement of the end 12 is complete. The elastic element is formed by the spring 14 which ensures that the screw 17 is held within the groove 24, without the threads of the screw 17 being capable of coming into engagement with the internal thread of the nut 18.

Thus, the shaft 3 can continue its rotation, even if the brake 23 has stopped the rotation of the flywheel 19. The brake 23 is thus used only for braking the flywheel 19, not for braking the rotation of the shaft 3. To be precise, the inertia of the shaft 3 may be high, for example if the shaft 3 is the rotor shaft of an electric motor. All the components of the rotor would contribute to the inertia of the shaft 3. The function of the brake 23, limited to the braking of the flywheel 19, makes it possible to reduce the dimensions of the brake 23.

Figure 3:
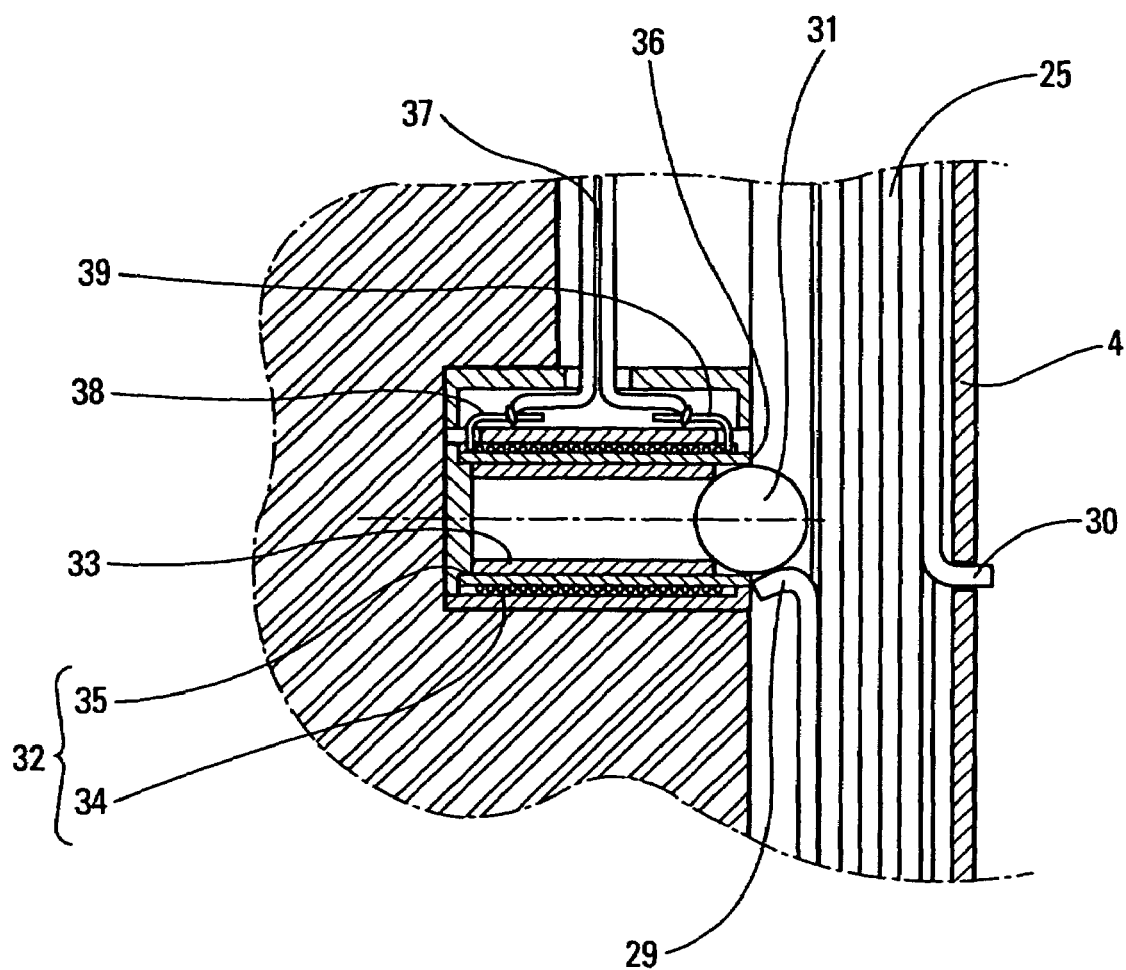
FIG. 3 illustrates an enlarged view of the brake of the coupling device.

FIG. 3 illustrates an enlarged view of the brake 23. This is a view developed in section through a cylindrical surface of axis 1. The brake 23 comprises a friction element 25 intended for rubbing against a surface 26 of the flywheel 19. The surface 26 is one or any of revolution about the axis 1. The brake 23 comprises, furthermore, means 27 for controlling the brake 23. When the means 27 are at rest, they keep the friction element 25 away from the surface 26, and, when the means 27 are activated, they allow the friction element 25 to come into contact with the surface 26. The view illustrated in FIG. 3 is partial and illustrates essentially the means for controlling the brake 23 and, in part, the friction element 25.

Advantageously, the friction element 25 is formed by a helical spring, the inside diameter of which is variable as a function of the tension of the spring. To simplify the rest of the description, the helical spring will bear the reference 25. The helical spring 25 is mounted in an internal cylindrical receptacle 28, of axis 1, of the casing 4. The helical spring 25 is thus wound around the axis 1. When the means 27 are at rest, the helical spring 25 is tensioned and kept at a distance from the surface 26 of the flywheel 19. The helical spring 25 is tensioned by applying a rotational movement about the axis 1 to one 29 of its ends, so as to increase the diameter of the helical spring 25.

When the means 27 are activated, the helical spring 25 is relaxed and comes into contact with the surface 26 of the flywheel 19, in order to brake the rotation of the flywheel 19 about the axis 1. More specifically, when the means 27 are activated, they relax the end 29 of the helical spring 25, the inside diameter of which is reduced until it comes into contact with the surface 26 of the flywheel 19 and thus brakes the latter. A second end 30 of the helical spring 25 is itself maintained in a fixed position with respect to the casing 4.

Advantageously, the means 27 for controlling the brake 23 comprise a ball 31 and means 32 for displacing the ball 31 from a first position, in which the ball 31 keeps the helical spring 25 tensioned, toward a second position, in which the helical spring 25 is relaxed. The first position can be seen in FIGS. 1 and 3. The second position of the ball 31 can be seen in FIG. 2.

The means 32 for displacing the ball 31 comprise a fusible element 33 which is illustrated in the solid state in FIGS. 1 and 3. In the solid state, the fusible element 33 keeps the ball 31 in the first position in which the latter holds the end 29 of the helical spring 25. When the fusible element 33 is in the liquid state, as illustrated in FIG. 2, the ball 31 is driven by the helical spring 25 or, more specifically, by the end 29 of the latter, toward the second position.

Advantageously, the means 32 for displacing the ball 31 comprise, furthermore, an electrical resistor 34 capable of heating the fusible element 33 by the Joule effect. More specifically, the ball 31 can slide within a cylinder 35. The ball 31 is held in the vicinity of one end 36 of the cylinder 35 in the first position by the fusible element 33. The electrical resistor 34 is formed by a wire coiled on an outer wall of the cylinder 35. The electrical resistor 35 is connected to an electrical supply cable 37 by means of two connecting studs 38 and 39. When the brake 23 is to be controlled, a current is circulated in the electrical resistor 34 by means of the supply cable 37, said current being sufficient to heat the cylinder 35 and consequently the fusible element 33 which is liquefied. The ball 31 can thus pass from the first to the second position, at the same time freeing the end 29 of the helical spring 25. Alternatively, it is possible to control the displacement of the ball 31 by means of an electromagnet replacing the fusible element 33.

The invention claimed is:

1. A device for coupling two shafts which are intended for rotating substantially about an axis with respect to a casing, the device comprising:
   a dog clutch making it possible for one of the shafts to drive the other and clutch release means making it possible to uncouple the dog clutch from a clutch engagement position toward a clutch release position:
   wherein the clutch release means comprise a screw secured to one of the shafts, a nut secured to a flywheel and cooperating with the screw, the screw and the nut having an axis coinciding substantially with the axis of rotation of the shafts, and a brake for braking the rotation of the flywheel with respect to the casing in that, in the clutch engagement position, the braking of the flywheel slackens the nut of the screw and drives one of the shafts in translational motion along said axis, so as to uncouple the dog clutch, in that the brake comprises a friction element intended for rubbing against a surface of the flywheel and means for controlling the brake, and in that the friction element is formed by a helical spring, the inside diameter of which is variable as a function of the tension of the helical spring.

2. The device as claimed in claim 1, wherein when the means for controlling the brake are at rest, the helical spring is tensioned and is kept at a distance from the surface of the flywheel, and in that, when the means for controlling the brake are activated, the helical spring is relaxed and the helical spring is in contact with the surface of the flywheel.

3. The device as claimed in claim 2, wherein the means for controlling the brake comprise a ball and means for displacing the ball from a first position, in which the ball keeps the helical spring tensioned, toward a second position, in which the helical spring is relaxed.

4. The device as claimed in claim 3, wherein the means for displacing the ball comprise a fusible element, wherein, when the fusible element is in the solid state, it keeps the ball in the first position, and wherein, when the fusible element is in the liquid state, the ball is driven by the helical spring toward the second position.

5. The device as claimed in claim 4, wherein the means for displacing the ball comprise an electrical resistor capable of heating the fusible element by the Joule effect.

6. The device as claimed in claim 1, comprising means for allowing the screw to rotate independently of the nut in the clutch release position.

7. The device as claimed in claim 6, wherein the means for allowing the rotation of the screw comprise a groove belonging to the flywheel, within which groove the screw can rotate freely, independently of the nut.

8. The device as claimed in claim 7, wherein the means for allowing the rotation of the screw comprise an elastic element which, in the clutch release position, ensures that the screw is held within the groove.

9. A device for coupling two shafts which are intended for rotating substantially about an axis with respect to a casing, the device comprising:
- a dog clutch for one of the shafts to drive the other;
- and a screw secured to one of the shafts;
- a nut secured to a flywheel and cooperating with the screw, the screw and the nut having an axis coinciding substantially with the axis of rotation of the shafts, and
- a brake for braking the rotation of the flywheel with respect to the casing in that, in the clutch engagement position, the braking of the flywheel slackens the nut of the screw and drives one of the shafts in translational motion along said axis, so as to uncouple the dog clutch, in that the brake comprises a friction element intended for rubbing against a surface of the flywheel and means for controlling the brake, and in that the friction element is formed by a helical spring, the inside diameter of which is variable as a function of the tension of the helical spring.

10. The device as claimed in claim 9, wherein when the means for controlling the brake are at rest, the helical spring is tensioned and is kept at a distance from the surface of the flywheel, and in that, when the means for controlling the brake are activated, the helical spring is relaxed and the helical spring is in contact with the surface of the flywheel.

11. The device as claimed in claim 10, wherein the means for controlling the brake comprise a ball and means for displacing the ball from a first position, in which the ball keeps the helical spring tensioned, toward a second position, in which the helical spring is relaxed.

12. The device as claimed in claim 11, wherein the means for displacing the ball comprise a fusible element, wherein, when the fusible element is in the solid state, it keeps the ball in the first position, and wherein, when the fusible element is in the liquid state, the ball is driven by the helical spring toward the second position.

13. The device as claimed in claim 12, wherein the means for displacing the ball comprise an electrical resistor capable of heating the fusible element by the Joule effect.

14. The device as claimed in claim 9, comprising means for allowing the screw to rotate independently of the nut in the clutch release position.

15. The device as claimed in claim 14, wherein the means for allowing the rotation of the screw comprise a groove belonging to the flywheel, within which groove the screw can rotate freely, independently of the nut.

16. The device as claimed in claim 15, wherein the means for allowing the rotation of the screw comprise an elastic element which, in the clutch release position, ensures that the screw is held within the groove.

* * * * *